US006719281B2

(12) United States Patent
Kohlert

(10) Patent No.: US 6,719,281 B2
(45) Date of Patent: Apr. 13, 2004

(54) CLAMPING ELEMENT FOR CLAMPING WORKPIECES IN A FLEXIBLE POSITION

(75) Inventor: Rudolf Kohlert, Stockstadt (DE)

(73) Assignee: A. Römheld GmbH & Co. KG, Laubach (DE)

( * ) Notice: Subject to any disclaimer, the term of this patent is extended or adjusted under 35 U.S.C. 154(b) by 36 days.

(21) Appl. No.: 10/196,675

(22) Filed: Jul. 16, 2002

(65) Prior Publication Data

US 2003/0015832 A1 Jan. 23, 2003

(30) Foreign Application Priority Data

Jul. 19, 2001 (DE) ........................................ 101 35 280

(51) Int. Cl.[7] ................................................ B23Q 3/08
(52) U.S. Cl. ................................................ 269/32
(58) Field of Search ............................. 269/32, 91, 93, 269/94, 208, 24, 27, 34

(56) References Cited

U.S. PATENT DOCUMENTS 4,673,173 A 6/1987 Shochi et al.

FOREIGN PATENT DOCUMENTS

| | | |
|---|---|---|
| DE | 86 21 050 | 10/1986 |
| DE | 35 28 337 | 2/1987 |
| DE | 199 30 990 | 12/2000 |
| EP | 0 614 729 | 9/1994 |

*Primary Examiner*—Robert C. Watson
(74) *Attorney, Agent, or Firm*—McGlew and Tuttle, P.C.

(57) ABSTRACT

A clamping element is provided for clamping workpieces in a flexible position with hydraulically actuated clamping jaws, which can be moved to the workpiece and can be fixed by a clamping insert (2; 30) guided in a housing (1; 29). The clamping insert is provided with an internally located piston (3), which is guided slidingly. Clamping jaws (20; 31) as well as a clamping lever (11), which is connected to the piston via a connecting rod (8) in an articulated manner, are associated with the clamping insert. The clamping operation moves the piston upward and presses the clamping lever onto the workpiece (25). The resistance originating from the workpiece brings about the stopping of the clamping lever and at the same time continues to raise the clamping insert, as a result of which the clamping jaws come into contact with the workpiece under the workpiece and firmly connect the workpiece to the clamping insert.

9 Claims, 3 Drawing Sheets

CLAMPING ELEMENT FOR CLAMPING WORKPIECES IN A FLEXIBLE POSITION

FIELD OF THE INVENTION

The present invention pertains to a clamping element for clamping workpieces in a flexible position with hydraulically actuated clamping jaws, which can be moved to the workpiece and fixed and make the clamping element into a floating element.

BACKGROUND OF THE INVENTION

Clamping elements are used to clamp workpieces in order to fix the workpiece immovably against all forces occurring during machining. It is necessary here to mount the workpiece in a positioned manner and to clamp it in this position and, furthermore, to support it with clamping elements wherever twisting or deformations of the workpiece may occur as a consequence of the forces occurring during machining. These clamping elements, which are preferably used to support the clamping operation, must have such a design that when brought into contact with the workpiece, they do not generate any transverse forces, which affect the preset position of the workpiece.

These clamping elements are usually brought to the workpiece in a hydraulically actuated manner. This approaching movement leads to a compensation between the clamping jaws located opposite each other to ensure that these come into contact with the workpiece with equal force. To achieve this, the hydraulic fluid is supplied to the drive mechanisms and the clamping jaws uniformly via only one delivery line, so that the distribution of the forces between the clamping jaws takes place via the hydraulic fluid. The clamping jaw that is the first to touch the workpiece stops as a consequence of the resistance originating from the workpiece, while the other clamping jaw continues to move until it comes into contact with the workpiece. A pressure acting uniformly on the workpiece is now building up between the two clamping jaws. However, if forces that are greater than the holding forces generated by the hydraulic system alone act on the workpiece, deformation of the workpiece will take place and the machining process will be compromised.

The prior-art clamping elements are subject to considerable frictional forces because of their design. This is due in part to seals which are necessary in the hydraulic system and seal the cylindrical parts against one another, while these are moving together. Large dimensions lead to heavy weights of the moving parts and consequently also to inertia forces, as a result of which deformations on the workpiece will not fail to occur, which leads to inaccuracies in production. Moreover, the clamping range of such elements cannot be adapted to all applications, which causes elements of different sizes to become necessary for machining different workpieces.

SUMMARY OF THE INVENTION

Thus, the object of the present invention is to associate with the clamping element a large clamping range, which can be adapted to different workpieces and to introduce the forces into the clamping operation such that they bring about the fixing of the workpiece without affecting same in its positioned position, and to maintain the holding forces introduced into the workpiece during the machining operation regardless of external effects.

According to the invention, a clamping element is provided for clamping workpieces in a flexible position with hydraulically actuated clamping jaws. The clamping jaws may be moved to the workpiece and can be fixed. A clamping insert with an internally located piston is guided slidingly in a housing. The clamping insert is provided with a clamping jaw and accommodates a clamping lever via a turning knuckle. The clamping lever is connected to the piston via a connecting rod in an articulated manner. The piston presses the clamping lever onto the workpiece during the clamping operation and raises the clamping insert due to the resistance exerted by the workpiece on the clamping lever, thus moving the clamping jaw under the workpiece. The workpiece becomes firmly connected to the clamping insert due to the build-up of force between the clamping lever and the clamping jaw.

The housing may have a cutout on one side. The clamping insert may be slidingly guided in the cutout via bevels provided in the housing and via guide surfaces provided on the clamping insert. The clamping insert may be provided on its side located in the cutout with a plurality of positioning holes, in which the clamping jaws can be accommodated in a positioned manner. The clamping jaw may be equipped with a fine adjusting screw.

A clamping piston may be guided in the housing in a cylindrical hole at right angles to the clamping insert. The clamping piston may move toward the clamping insert when pressure is admitted and presses same with its guide surfaces into the bevels of the housing and fix same.

The feed lines of the hydraulic system to the connections in the clamping insert may be flexible.

A spring may be supported at the bottom of the housing. The spring force of this spring may compensate the weight of the clamping inserts. The spring may be inserted into the clamping insert.

The clamping insert may have a cylindrical design and may be slidingly guided in a housing. A piston may be provided with a connecting rod and with a clamping lever at the head and may be mounted in the clamping insert. The clamping piston has a pressing surface that may have a prismatic design and may be adapted to the cross section of the clamping insert. This may press the clamping insert into the wall of the cylindrical hole in the housing when pressure is admitted. The pressing surface may be arranged at right angles to the clamping insert.

The tubular springs may establish a flexible connection for the hydraulic system between the outer connections on the housing and the pressure chambers in the cylindrical space of the clamping insert for the actuation of the piston. These tubular springs may be arranged in the housing below the guided clamping insert. The tube springs may be connected to the ends with the corresponding connections and channels by means of nipples and straps.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
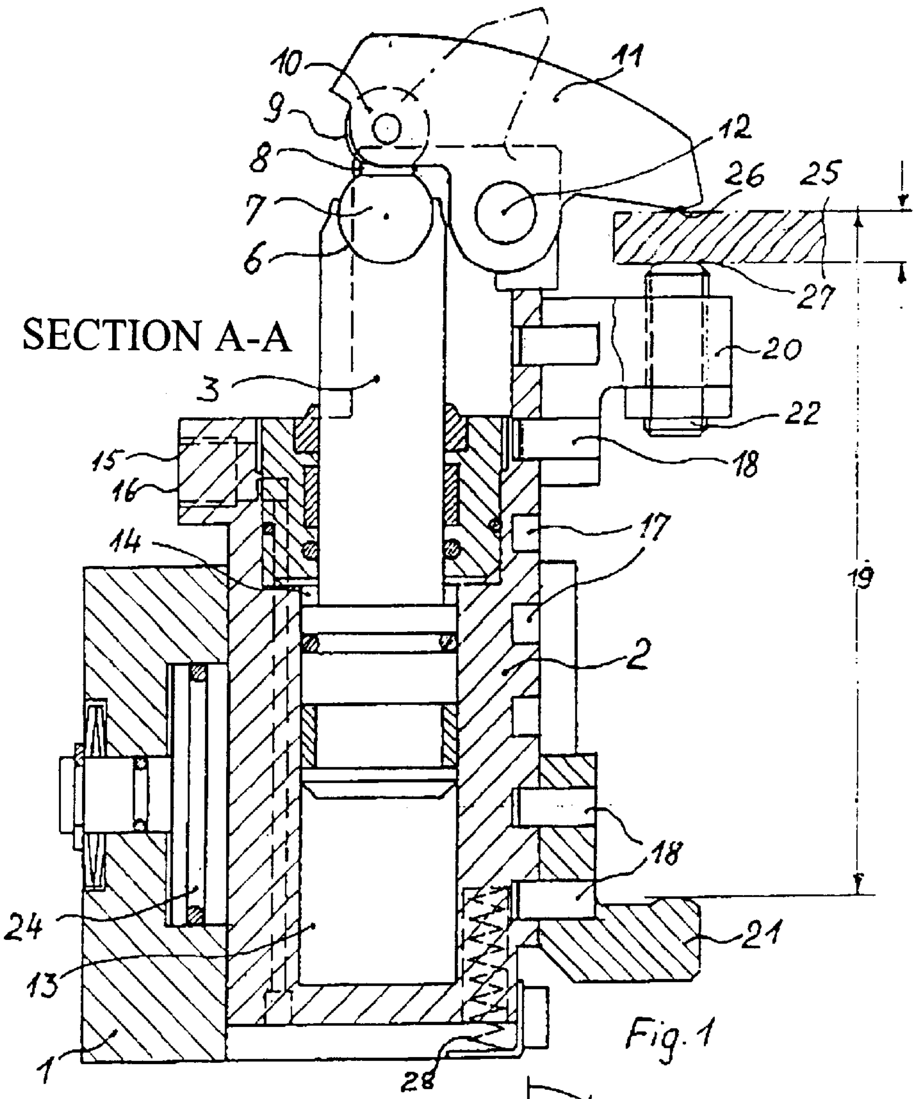
FIG. 1 is a longitudinal sectional view of a clamping element along line A—A of FIG. 3.
Figure 2:
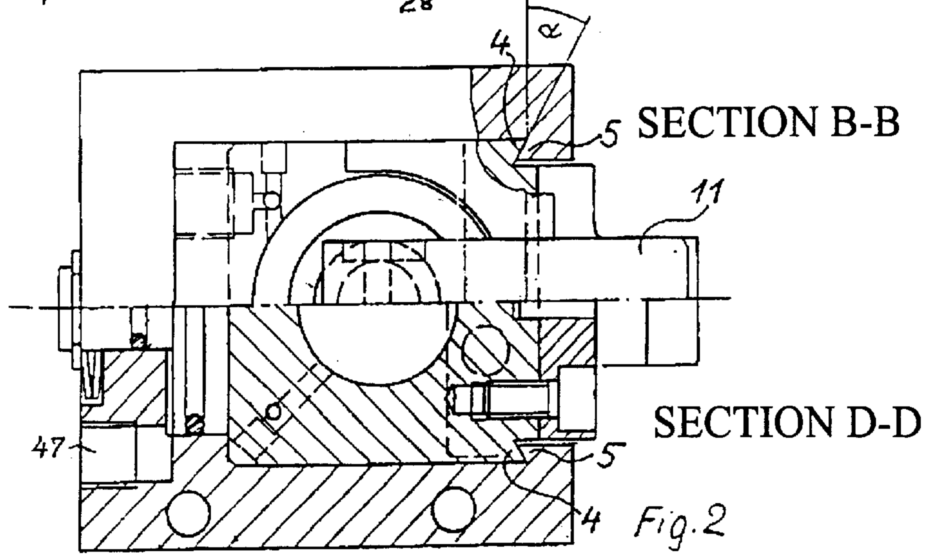
FIG. 2 is a cross sectional view of a clamping element of FIG. 1 showing the section along line B—B of FIG. 3 and line D—D of FIG. 4.
Figure 3:
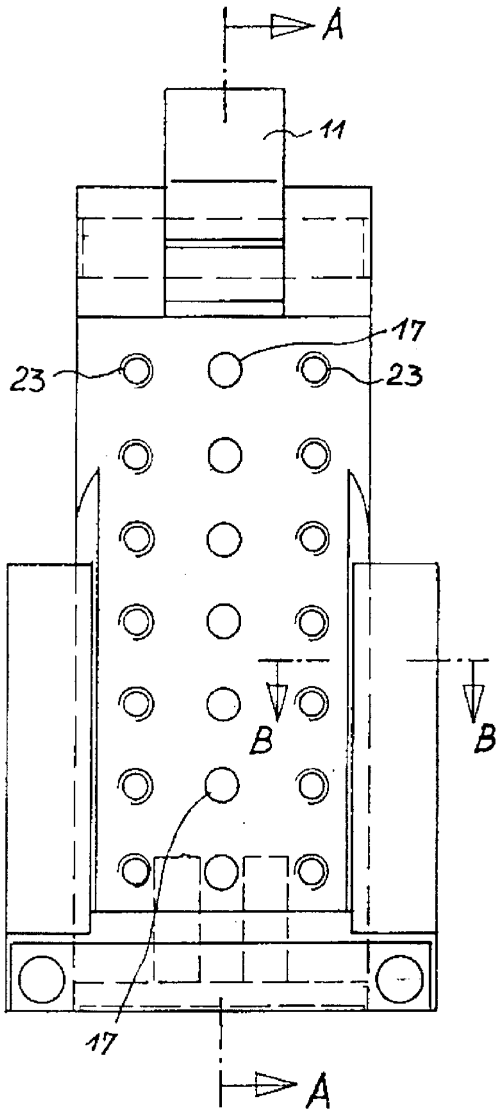
FIG. 3 is a side view of a clamping element of FIG. 1.
Figure 4:
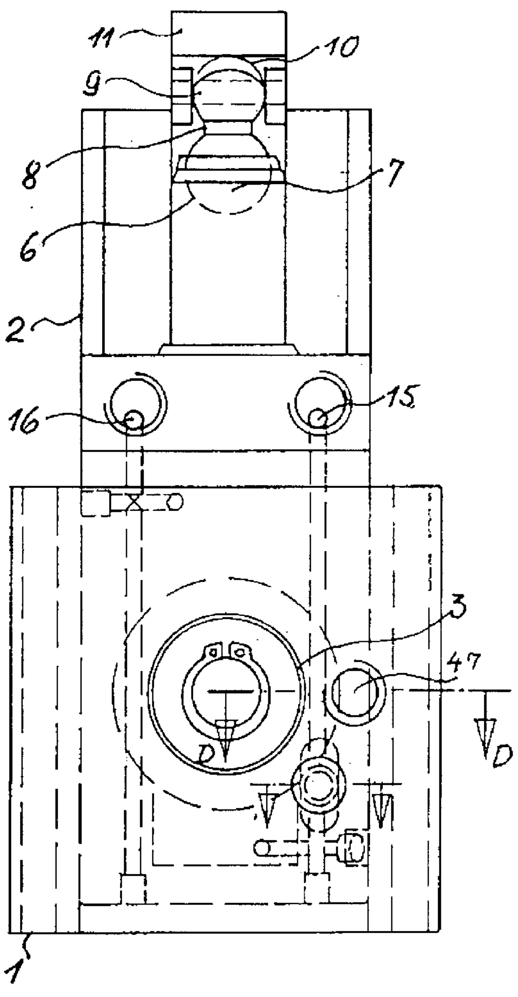
FIG. 4 is a side view of a clamping element of FIG. 1.

Referring to the drawings in particular, FIG. 1 shows a sectional view of the clamping element. A clamping insert 2 is guided in the stationary housing 1. This clamping insert 2 has a rectangular cross section and is inserted into the housing such that it protrudes from the housing on one side. The housing 1 is correspondingly provided with a cutout on one side. To guide the clamping insert 2, the latter is provided with oblique guide surfaces 4 on the side of the cutout of the housing, and the housing 1 is provided with inwardly directed bevels 5. The clamping insert 2 is thus guided slidingly in the housing 1 on the sides and contact surfaces.

The piston 3 is guided in the clamping insert 2. At its head, the piston 3 has a calotte 6, in which a ball 7 is mounted as a part of a connecting rod 8. A second ball 9, which is introduced into a calotte 10 of a clamping lever 11, belongs to the connecting rod 8. The clamping lever 11 has a turning knuckle 12, which is located in the upper part of the clamping insert 2. The piston 3 has two pressure chambers, of which the pressure chamber 13 is used for clamping and the pressure chamber 14 for releasing. The pressure chambers are supplied via two flexible delivery lines via the connections 15 and 16.

On its side located in the cutout of the housing, the clamping insert 2 is provided with a plurality of positioning holes 17, which are recessed into the lateral surface along this lateral surface. Positioning pins 18 can be inserted into these positioning holes 17. The positioning holes are introduced at preset distances from one another. Depending upon the application, the user chooses the holes to set the desired distance. The positioning holes are used to make it possible to reduce the maximum stroke 19 of the clamping system and to adapt it to the particular workpiece inserted. These positioning holes receive clamping jaws 20 and 21, of which the clamping jaw 20 is provided with a thread, into which a fine adjusting screw 22 with securing nut is introduced. These clamping jaws are provided with corresponding fitting holes, in which a particular positioning pin fits, so that the clamping jaws 20, 21 can be introduced into the positioning holes 17 as described and can be fixed in corresponding threaded holes 23 by means of threaded bolts.

A clamping piston 24 is provided in the housing 1 in a cylindrical hole at right angles to the clamping insert 2. This clamping piston 24 is designed such that it presses the outer wall of the clamping insert 2 in the pressurized state. The clamping piston 24 is actuated separately, but it may also be actuated by means of a follower control as a function of the completed clamping state.

The piston 3 is moved downward in the inoperative position and the clamping insert 2 is in its lowermost position. Depending on the thickness of the workpiece, the clamping jaw 20 is brought into the corresponding positioning holes and adjusted to the workpiece by means of the fine adjusting screw 22. The clamping jaw 20 is eliminated only in the case of large workpieces that require the maximum stroke 19 and can be placed directly on the clamping jaw 21. The lever arm 11 is pivoted upward into the vertical position and it thus frees the space for the insertion of the workpiece 25.

If the workpiece is associated with the clamping element for clamping, the clamping operation is initiated. Pressure is admitted into pressure chamber 13, the piston 3 moves upward and moves the clamping lever 11 in the turning knuckle 12 toward the workpiece 25. The connecting rod 8 with its balls 7, 9 ensures the compensation of the movement. This process continues until the clamping lever 11 with its pressing surface 26 comes to lie on the workpiece 25. The workpiece now stops the movement of the clamping lever as a consequence of the developing resistance. This clamping operation takes place without appreciable friction at the movement surfaces. This means that the pressing surface 26 of the clamping lever 11 also fails to introduce any appreciable force into the workpiece 25. However, the hydraulic pressure, which continues to be present, continues to move the piston farther upward. Due to the clamping lever 11 being supported on the workpiece 25, the clamping insert 2 is now carried by the piston 3 and the fulcrum point 12 is moved upward. The clamping jaw 20 is thus moved to the workpiece 25 at the bottom and it comes into contact. This operation is supported by the spring 28, which is inserted vertically, so that it supports the raising of the clamping insert 2 by absorbing the weight of the clamping insert. If the clamping jaw 20 is in contact with the workpiece 25, there is a pressure equalization at the workpiece between the pressing surface 26 of the lever 11 and the pressing surface 27 of the fine adjusting screw 22, and a pressure, which is uniform on both sides, builds up at the workpiece, and the clamping insert 2 becomes firmly connected to the workpiece as a result.

This clamping operation is maintained as long as the pressure in the feed line 15 is present. The clamping insert, which is still movable vertically in its guides, is now fixed in the housing 1. This is brought about by the fact that pressure is admitted to the clamping piston 24, which exerts a pressure on the lateral surface of the clamping insert 2 and presses the clamping insert 2 with its bevels 5 against the guide surfaces 4 of the housing 1 as a result. The clamping piston 24 thus fixes the clamping insert 2 in the housing 1 and consequently also the workpiece 25.

The clamping operation acts optimally when the fulcrum point and center of the ball 7 is located on one straight line as the center of the turning knuckle 12 and the contact point of the pressing surface 26.

For release, the pressure is removed from the clamping piston 24, which is returned into its starting position by means of corresponding disk springs. At the same time, the pressure in the pressure chamber 13 is released and pressure is admitted to the pressure chamber 14, and the piston 3 is thus returned, the lever 11 pivots into its inoperative position, and the workpiece 25 is released for removal.

The vertical stroke of the clamping insert can be limited by corresponding measures, such as a longitudinal groove and a screw.

The clamping element can be used as an element with a flexible position and consequently as a floating element. A floating element adapts itself to the already preclamped workpiece and supports the latter at the points at which machining forces, which contribute to the twisting or even deformation of the workpiece, may act.

Figure 6:
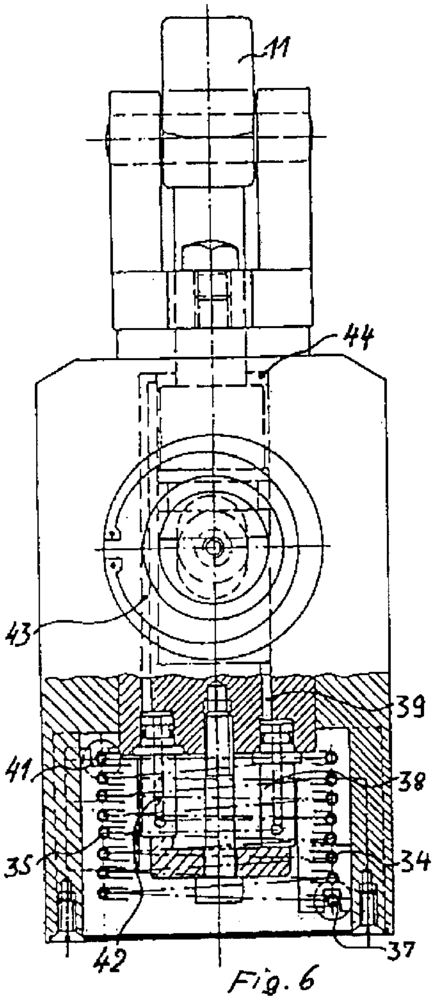
FIG. 6 is a side view of the clamping element of FIG. 5.
Figure 5:
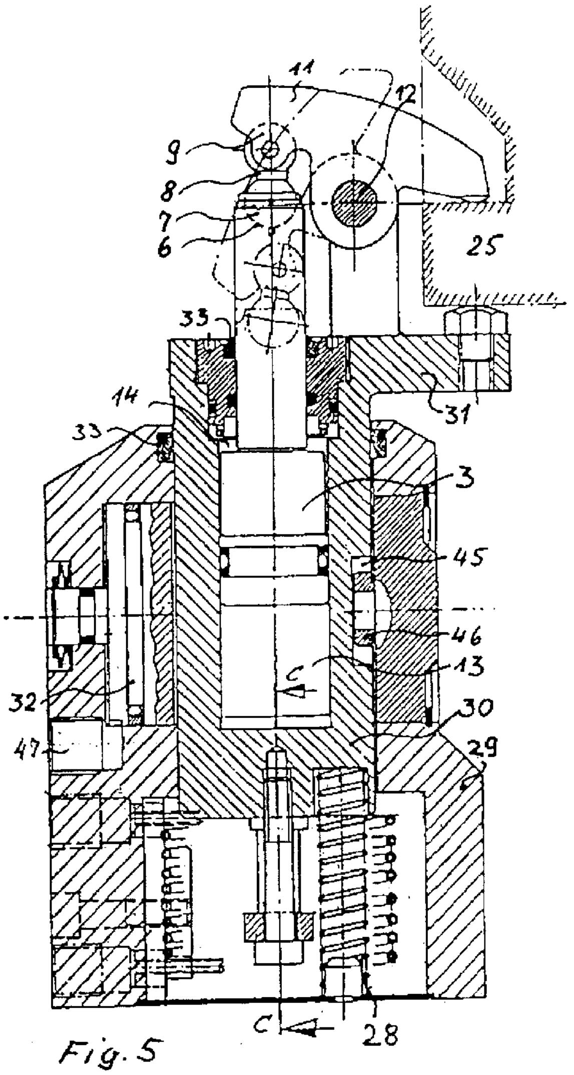
FIG. 5 is a sectional view of a clamping element with tube spring system.
Figure 7:
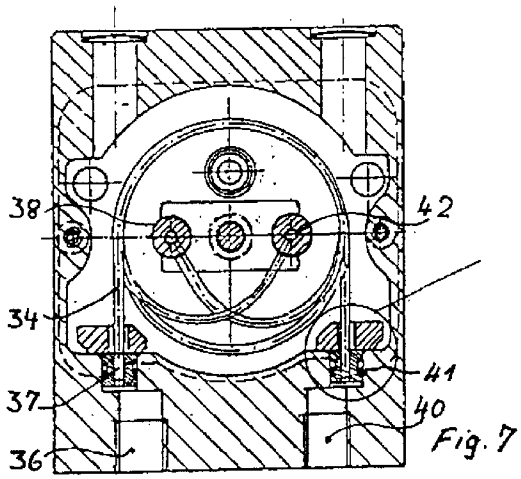
FIG. 7 is a cross sectional view of the clamping element of FIG. 5.

FIGS. 5–7 show another element. A clamping insert 30 with circular cross section is guided in the housing 29. The piston 3, which carries at the head end the connecting rod 8 with the balls 7;9 as well as the clamping lever 11 by means of a calotte 6, is introduced into the interior of the clamping insert 30. The clamping insert 30 has, at the head end, the turning knuckle 12 for the clamping lever 11 and a stationary projecting clamping jaw 31. The workpiece 25 can be inserted between the clamping jaw 31 and the clamping lever 11.

A clamping piston 32 is used to fix the clamping insert 30 in the clamped state; however, this clamping piston 32 is provided with a prismatic adjusting surface, which is adapted to the circular cross section of the clamping insert. The clamping piston 32 is actuated via a pressure channel 47 of its own. In the clamped state, the clamping piston presses the clamping insert against the inner hole of the housing and thus fixes same.

The movement of the clamping insert is made easy, on the one hand, by a nearly frictionless guiding in the housing, and it is not compromised by the dirt scrapers 33, because they just barely come into contact with the clamping insert. On the other hand, two tube springs 34; 35 are provided, which are used as feed lines for the hydraulic system. The two tube springs 34, 35 fit into the system without friction because they increase or decrease their length depending on the direction of movement of the clamping insert, without generating an appreciable restoring force.

The introduction of the tube springs 34, 35 leads to exact connections concerning the hydraulic transitions. The tube spring 34 is used to pressurize the system and the tube spring 35 to release the pressure from the system. For pressurization, pressure is admitted to the pressure chamber 3. To do so, the hydraulic fluid is introduced into the tube spring 34 at the connection 36 via the nipple 37 and into the pressure chamber 13 via the nipple 38 and the channel 39. The piston 3 moves upward and brings the clamping lever 11 into contact with the workpiece 25. The resistance at the workpiece 25 is sufficient to move the clamping insert 30 upward together with the piston 3 until the clamping jaw 31 comes to lie on the underside of the workpiece 25. The pressure now builds up at the lever 11 and at the clamping jaw 31 to equal levels, as a result of which the clamping insert becomes firmly connected to the workpiece. Pressure is now admitted to the clamping piston 32, the clamping insert 30 is pressed against the wall of the housing and is clamped in this position in the housing 29.

For release, pressure is admitted into the tube spring 35 via the connection 40 and the nipple 41, and the hydraulic fluid is sent here from into the piston chamber 44 via the nipple 42 and the channel 43. The clamping piston 32 was returned before by releasing the hydraulic pressure at 47 by means of its disk spring and the pressure was released from the pressure chamber 13. The tube springs are held by nipples and straps by means of a screw connection. The tube spring 35 is connected to its nipple 38 by brazing.

To protect the clamping insert against rotation, a pocket 45 is provided, which is engaged by a movable roller 46.

While specific embodiments of the invention have been shown and described in detail to illustrate the application of the principles of the invention, it will be understood that the invention may be embodied otherwise without departing from such principles.

What is claimed is:

1. A clamping element for clamping workpieces in a flexible position with hydraulically actuated clamping jaws, which can be moved to the workpiece and can be fixed, the clamping element comprising:

a housing a clamping insert, said clamping insert being guided slidingly in said housing, said clamping insert having a clamping jaw and accommodating a clamping lever via a turning knuckle;

a connecting rod;

a piston provided in said clamping insert, said clamping lever being articulated to said piston via said connecting rod, said piston pressing said clamping lever onto the workpiece during the clamping operation and raising the clamping insert due to the resistance exerted by the workpiece on the clamping lever and moving the clamping jaw under the workpiece to connect the workpiece firmly to the clamping insert due to the build-up of force between the clamping lever and the clamping jaw.

2. A clamping element in accordance with claim 1, wherein the housing has a cutout on one side and said clamping insert is slidingly guided in the cutout via bevels provided in the housing and via guide surfaces provided on the clamping insert; and said clamping insert is provided on a side located in said cutout with a plurality of positioning holes, in which the clamping jaws can be accommodated in a positioned manner.

3. A clamping element in accordance with claim 1, wherein said clamping jaw is equipped with a fine adjusting screw.

4. A clamping element in accordance with claim 1, further comprising a clamping piston guided in said housing in a cylindrical hole at right angles to the clamping insert, said clamping piston moving toward said clamping insert when pressure is admitted and pressing said clamping insert with guide surfaces into bevels of the housing and fixing said clamping insert.

5. A clamping element in accordance with claim 1, further comprising flexible feed lines of a hydraulic system connecting to connections in the clamping insert.

6. A clamping element in accordance with claim 1, further comprising a spring supported at a bottom of said housing, said spring providing a spring force for compensating a weight of said clamping insert, said spring being inserted into the clamping insert.

7. A clamping element in accordance with claim 1, wherein the clamping insert has a cylindrical design and is slidingly guided in said housing and said piston is provided with said connecting rod and with said clamping lever at a head location and said piston is mounted in said clamping insert; and a clamping piston having a pressing surface with a prismatic design and adapted to a cross section of said clamping insert presses said clamping insert into a wall of the cylindrical hole in said housing when pressure is admitted, said clamping piston being arranged at right angles to the clamping insert.

8. A clamping element in accordance with claim 1, further comprising: tubular springs establishing a flexible connection for a hydraulic system between outer connections on the housing and pressure chambers in the cylindrical space of the clamping insert for the actuation of said piston are arranged in said housing below said guided clamping insert.

9. A clamping element in accordance with claim 7, wherein said tube springs are connected to ends with the corresponding connections and channels by means of nipples and straps.

* * * * *